United States Patent [19]

Hassett et al.

[11] Patent Number: 5,406,275
[45] Date of Patent: Apr. 11, 1995

[54] OBJECT LOCATION PROCESS AND APPARATUS

[75] Inventors: John J. Hassett, Marblehead; Warran A. Hartman, Beverly; Keith E. Kowal, Swampscott, all of Mass.

[73] Assignee: AT/COMM Incorporated, Marblehead, Mass.

[21] Appl. No.: 901,277

[22] Filed: Jun. 19, 1992

Related U.S. Application Data

[63] Continuation-in-part of Ser. No. 525,103, May 17, 1990, Pat. No. 5,144,553.

[51] Int. Cl.$^6$ ................................................ G08G 1/01
[52] U.S. Cl. .................................... 340/933; 235/384; 340/928; 342/44; 455/56.1
[58] Field of Search ............... 340/933, 934, 932.2, 340/937, 928, 988, 991, 901, 903, 905, 994, 989; 364/401, 452, 460, 449; 342/42, 44, 51, 125, 357, 386, 388, 389, 450, 457; 455/56.1, 66; 235/384

[56] References Cited

U.S. PATENT DOCUMENTS

| | | | |
|---|---|---|---|
| 3,602,881 | 8/1971 | Bayne | 340/928 |
| 3,662,328 | 5/1972 | Spivak | 340/903 |
| 3,697,941 | 10/1972 | Christ | 340/991 |
| 4,031,513 | 6/1977 | Simciak | 340/870.18 |
| 4,104,630 | 8/1978 | Chasek | 343/6.5 R |
| 4,303,904 | 12/1981 | Chasek | 235/384 |
| 4,338,587 | 7/1982 | Chiappetti | 340/928 |
| 4,481,428 | 11/1984 | Charlot, Jr. | 340/870.26 |
| 4,494,119 | 1/1985 | Wimbush | 342/457 |
| 4,501,958 | 2/1985 | Glize et al. | 235/382 |
| 4,532,511 | 7/1985 | Lemelson | 340/933 |
| 4,593,273 | 6/1986 | Narcisse | 342/125 |
| 4,619,002 | 10/1986 | Thro | 455/56.1 |
| 4,786,903 | 11/1988 | Grindahl et al. | 340/825.54 |
| 4,884,208 | 11/1989 | Marinelli et al. | 364/460 |
| 4,896,161 | 1/1990 | Shibano | 340/988 |
| 4,937,581 | 6/1990 | Baldwin et al. | 342/44 |
| 5,003,317 | 3/1991 | Gray et al. | 342/457 |
| 5,086,389 | 2/1992 | Hassett et al. | 364/401 |
| 5,128,669 | 7/1992 | Dadds et al. | 340/905 |
| 5,144,553 | 9/1992 | Hassett et al. | 340/928 |
| 5,163,004 | 11/1992 | Rentz | 364/460 |
| 5,208,756 | 5/1993 | Song | 340/991 |
| 5,289,183 | 2/1994 | Hassett et al. | 340/928 |

FOREIGN PATENT DOCUMENTS

| | | | |
|---|---|---|---|
| 0401192 | 12/1990 | European Pat. Off. | 340/928 |
| 2630562 | 10/1989 | France | 340/928 |
| 0159526 | 7/1987 | Japan . | |
| 0288399 | 11/1988 | Japan . | |

OTHER PUBLICATIONS

Desmond, "Toll Booth Net Automates Fare Collection Saves Cash", Network World, vol. 46, Issue N23, Jun. 12, 1989.

Encyclopedia of Computer Science and Engineering, Van Nostrand Reinhold Company, Inc., 1983, pp. 563–565.

Primary Examiner—Brent Swarthout
Attorney, Agent, or Firm—Lahive & Cockfield

[57] ABSTRACT

Methods and apparatus for the determination of the location of a mobile vehicle relative to a radio transceiver. The apparatus incorporates a mobile transceiver that calculates its location relative to at least a first stationary transceiver, and communicates this location back to the stationary transceiver. As a mobile vehicle enters the radio field radiated from at least a first stationary transceiver unit, the mobile vehicle transceiver begins measuring the energy of one or more radiated signals as an analog value, converts the analog value to digital form, from which a microprocessor and software algorithm calculates the specific distance from the stationary transceiver, and then returns a data string that informs the stationary transceiver of its location. This system thus allows both the mobile transceiver and the stationary transceiver unit to gain specific information with regard to the relative distance between mobile and base station units.

13 Claims, 4 Drawing Sheets

OBJECT LOCATION PROCESS AND APPARATUS

Reference to Related Patents

The subject matter of this application is related to that disclosed in U.S. Pat. No. 5,086,389 entitled Automatic Toll Processing Apparatus and is a continuation in part of U.S. patent application Ser. No. 525,103, filed May 17, 1990, now U.S. Pat. No. 5,144,553, entitled Electronic Vehicle Toll Collection System and Method. The above cited patent and patent application are assigned to the assignee of the present application, and are incorporated herein by reference.

BACKGROUND OF THE INVENTION

The present invention relates generally to systems for traffic monitoring and management. More particularly, it relates to apparatus and method for utilizing a two-way radio transponder to accurately and automatically determine the lane position of vehicles as they traverse a roadway, bridge, tunnel or other form of transport such as a railway.

An increasing number of vehicles are traveling over progressively more congested transportation networks. In order to improve the efficiency of transportation networks, automated travel management systems are being employed to optimize the capabilities of these networks. One example of particularly severe inefficiency and congestion is toll plazas, where, under present circumstances, traffic must be completely halted in order to safely perform the manual exchange of currency for the right to proceed. The collection of tolls by conventional means has had a negative effect upon highway throughput and safety. Congestion and long backups at toll plazas are becoming more common, the resulting delay, expense and reduced productivity are becoming more burdensome.

In response to the inability of conventional toll collection means to meet the demands created by increased highway traffic, automated toll facilities that provide improved toll collection methods and systems have been proposed. These automated toll facilities eliminate the manual transactions of conventional toll collection means through the use of radio transmitters and receivers that perform the necessary transactions as a vehicle travels through the automated toll booth. One such system electronically collects tolls from an electronic cache of toll credits carried within the vehicle. In this way, a vehicle operator can purchase a quantity of toll credits prior to traveling on a toll road. As the vehicle later travels through a toll collection booth, a radio-frequency exchange occurs and the appropriate amount is automatically debited from the vehicle's toll credits.

Although the automated toll collection system described above functions well for single lane toll roads or single lane bridges and tunnels, a significant problem can exist when the system is practiced in a multi-lane environment. In a multi-lane environment, each toll lane is equipped with a stationary radio-transceiver to interact with the mobile radio-transceiver of vehicles passing through that lane. The problem of multi-pathing occurs when information transmitted from a vehicle in one lane is picked up by multiple toll lane stationary transceivers. Therefore the possibility exists that a toll collected from a vehicle in lane 1 may be credited to the vehicle in lane 2. The effect of multi-pathing allows toll-evaders to exploit automated toll systems, as well as accidentally misallocating the debits.

A number of prior art systems exist that minimize the effects of multi-pathing. These systems typically attempt to shield the toll transceiver of one lane from signals transmitted from mobile units traveling in an adjacent lane. Such systems include methods that establish a proximity zone that identifies when a vehicle has entered a predetermined region, and then requires the vehicle to transmit the toll within a predetermined time limit. Other systems establish a multi-field environment, where a blanking field is transmitted behind and adjacent to a region proximate to the toll lane. The blanking zone serves to swamp out any multi-path signals that could be received by the toll station. The prior art systems do not provide a means for determining the actual lane position of an oncoming mobile unit. Because of this, the prior art systems do not allow the toll system to determine the physical sequence of oncoming traffic approaching the toll system. Moreover, the prior art systems place constraints on the size of the lanes and the spacing that must exist between each lane transceiver.

Accordingly, an object of the present invention is to provide a system for determining the lane position of a vehicle approaching an automated toll system.

A further object of the invention is to provide a mechanism for determining the sequence of mobile units approaching an automated toll system.

An additional object of the invention is to provide a system for determining the relative position of a mobile object approaching a stationary transceiver.

And yet another object of the invention is to provide a system for automatic toll collection that uses toll transceivers that can work in close proximity with other toll transceivers.

Other general and specific objects of the invention will in part be obvious and will in part appear hereinafter.

SUMMARY OF THE INVENTION

The foregoing objects are attained by the invention, which provides methods and systems for automatically determining the position of a mobile vehicle approaching a stationery transceiver.

One aspect of the invention includes at least one stationery transceiver unit positioned above one lane of a multi-lane roadway that transmits an identification signal in a known field pattern. A mobile transceiver unit traveling along the multi-lane roadway receives the identification signal and decodes the identity of the stationery transceiver unit and evaluates the strength of the signal. From this information, the mobile transceiver determines its position with respect to the stationery transceiver unit.

In particular, at least one stationery transceiver unit is positioned above one lane of a multi-lane roadway. The transceiver includes a highly directional antenna that transmits a radio-frequency signal. The signal is directed along the roadway and in the direction of oncoming traffic. The directional signal broadcast from the antenna sets up a field pattern within one lane of the multi-lane roadway. By encoding the signal with information that identifies the lane in which the antenna is directed, a radio-frequency field can be set up that uniquely identifies one lane of the roadway.

A vehicle equipped with a transceiver made in accordance with the present invention can determine its lane of travel and its distance from the stationary transceiver by receiving and processing the antenna field pattern. The mobile transceiver, fixed within a vehicle such as an automobile, receives signals generated by the stationery transceivers. The mobile transceiver then decodes these signals and determines from which lane the signal was broadcast. The mobile transceiver then associates with each lane identity a signal strength that can be compared to the known field pattern of the stationery transceiver directional antenna. The mobile transceiver processes the signal strength and signal identity and determines its location relative to the stationary transceiver.

Subsequently, as the vehicle passes the stationary transceiver units, it transmits its vehicle identification number and its lane position so that the stationary transceivers know which vehicle is passing in which lane.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings in which.

DETAILED DESCRIPTION

Figure 1:
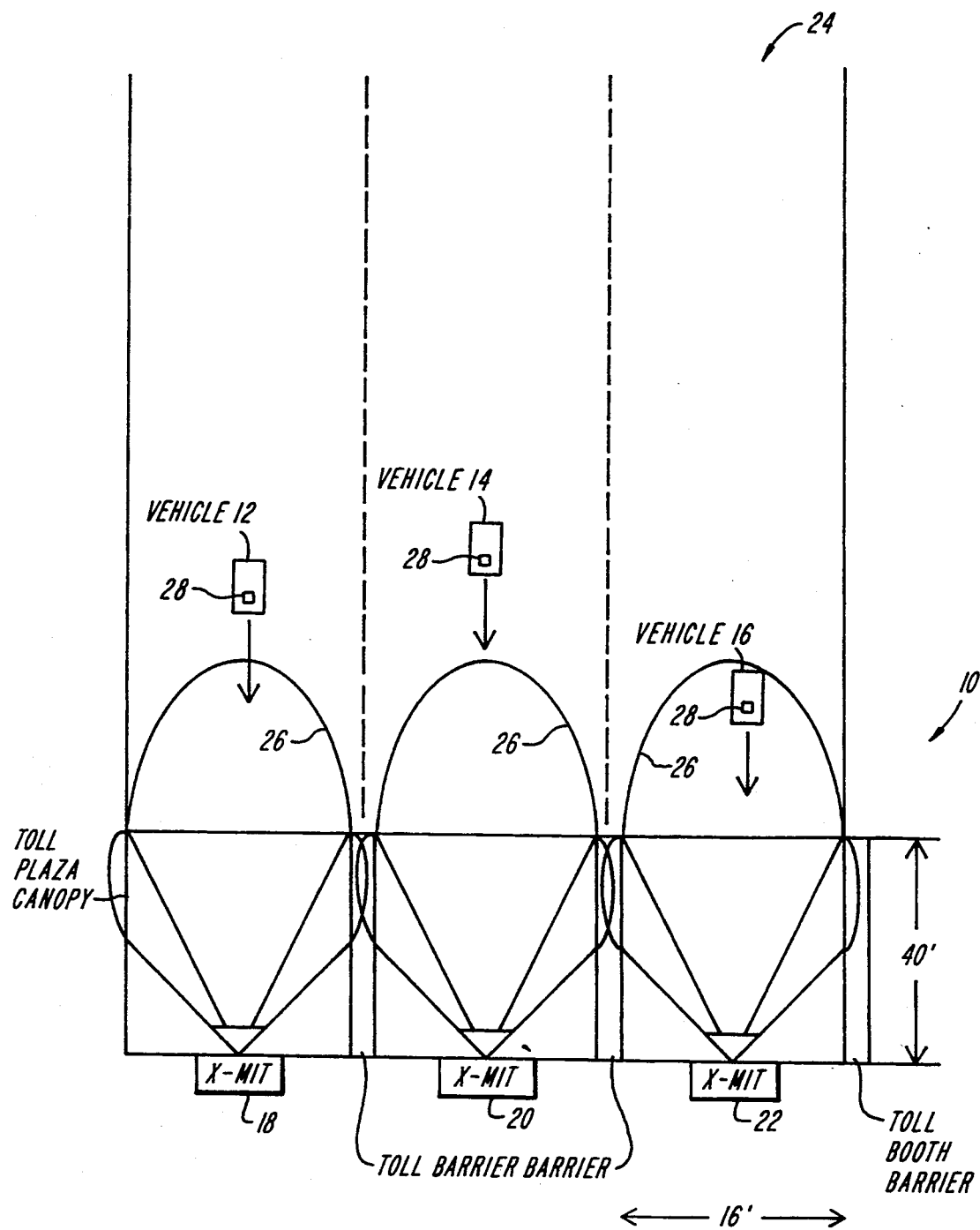
FIG. 1 shows a schematic block diagram of a roadway traffic monitoring and management system according to the invention.

FIG. 1 shows a block diagram of a multi-lane vehicle location system 10 according to the invention. The illustrated embodiment 10 enables vehicle position to be determined and transferred from vehicle transponders, located in host vehicles 12–16, to the lane transmitter units 18–22, as the vehicles 12–16 travel along the roadway 24.

For simplicity, FIG. 1 depicts a three-lane road 24 on which the direction of travel for a given host vehicle, referred to herein as the "downstream" direction, is indicated by arrows. Those skilled in the art will appreciate that the invention can be practiced in connection with roadways having additional lanes, including multi-lane divided highways, bridges and tunnels. As one skilled in the art will appreciate the invention can also be practiced in connection with numerous other transport systems, such as railways, and waterways.

The illustrated embodiment includes two primary components; the vehicle transponders 28, and the lane stationary transceivers 18–22. As discussed in further detail below, a vehicle transponder 28, according to a preferred embodiment, is carried by a host vehicle and includes a radio frequency transmitter and receiver, a central processing unit, an early warning signal detection unit, a signal strength detection unit, a signal decoding unit, and a user interface. The preferred embodiment of the roadway stationary transceiver includes a transmitter unit and a directional antenna having a known antenna pattern directed at the lane below the transmitter unit.

The vehicle transponder 28 receives signals from the lane transmitter units 18–22 and processes these signals to determine which lane stationary transmitter unit sent a particular signal. The transponder 28 may also process the signals to determine the relative strengths of the signals received from the various lane transmitting units. By comparing the measured strengths of the received signals and comparing this information to known antenna field strength patterns, the transponders can determine their lane position and accordingly the vehicle position relative to the lane transmitting units.

In the embodiment of the present invention illustrated in FIG. 1, the lane transmitting units 18–22 are positioned across the multi-lane roadway so that one transmitting unit is positioned above each lane. As further indicated by FIG. 1, each of transceivers 18 through 22 radiates a lane identification signal that establishes an antenna field pattern 26 in the direction of on-coming traffic. The lane identification signal is encoded with lane identification information so that a single field pattern is associated with a particular lane. In the illustrated embodiment, the signal generated by transceivers 18–22 is a radio-frequency (RF) signal.

Figure 2:
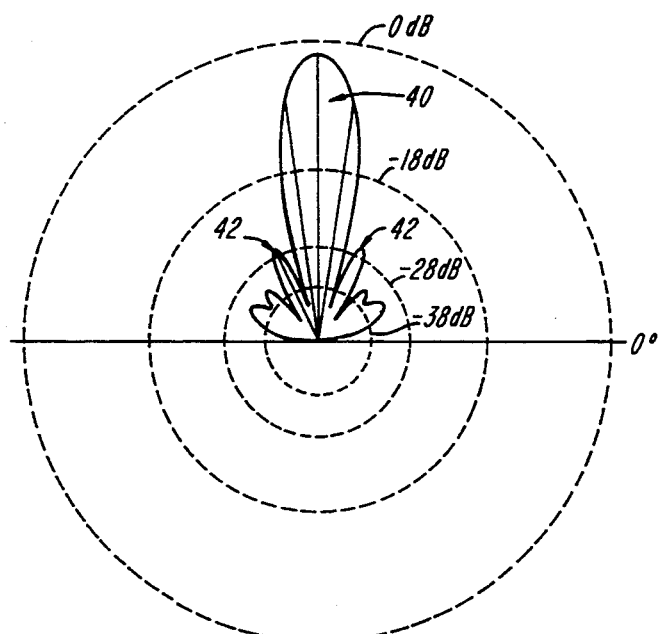
FIG. 2 is a graphical depiction of the antenna field pattern plotted in polar coordinates.

FIG. 2 illustrates in more detail the antenna pattern radiated from the transmitting units of transceivers 18–22. In the example illustrated in FIG. 2, the field pattern is established by a phased array radar system with parasitic directors transmitting at 904.5 Mhz, but it should be apparent that any similar transmitting device known in the art could be used. More specifically, the antenna field pattern was generated by a slotted waveguide array with longitudinal polarization in the direction of travel and beam shaping. The phased array antenna transmits the majority of its radiated energy within the main lobe 40. As is known in the art, the side lobes 42 are minimized to prevent false target detection. As shown in FIG. 2, the side lobes are attenuated approximately 18 db from the main lobe and extend at approximately 25 degree angles. By radiating such known field patterns along each lane of the roadway, the roadway is effectively divided into separate radiation field regions.

It should be apparent to those skilled in the art that in an alternative embodiment of the invention, a back lobe projected from the rear of the antenna, is used to create a larger region of known field pattern.

Figure 3:
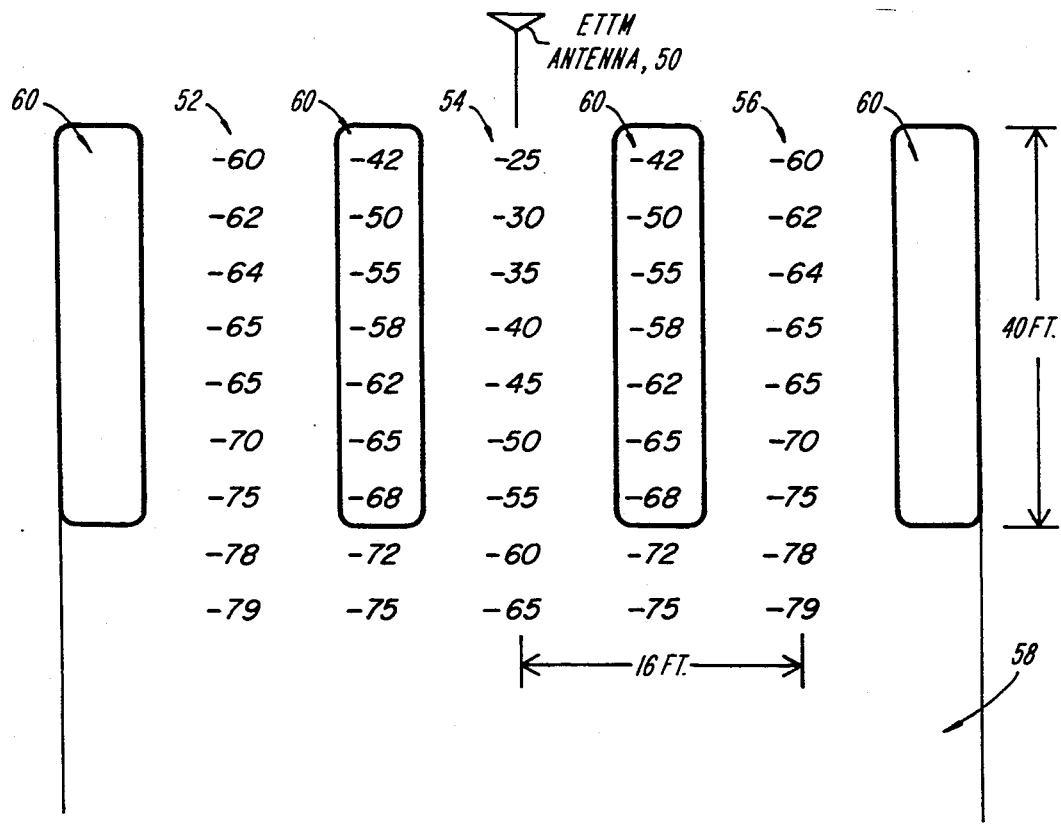
FIG.3 is a graphical diagram of one embodiment of the present invention illustrating the pattern of radio field energy established by an antenna.

FIG. 3 illustrates an example of the roadway being divided into known regions by antenna patterns. In FIG. 3, an antenna element 50 radiates a known field activity pattern along three lanes 52, 54, and 56 of a roadway 58. In the illustrated embodiment, each lane of the roadway is separated by a toll barrier 60. The numerical values in each lane or at each barrier, e.g. (−25) represent the decrease in intensity level of the RF field at each location expressed in db. In the example shown, a signal directed along the center lane 54 establishes an energy gradient that relates to the distance from the antenna element 50. In the illustrated example, the antenna field strength in lane 54 decreases 30 db over the forty feet measured from one end of the toll barrier 60 to the far end. As further shown in FIG. 3, parallel positions within the adjacent lanes 52 and 56 are a minimum of 14 db below a parallel point in the center lane 54, (i.e., −65 db for the center lane and −79 db for the adjacent lanes). As a mobile transceiver approaches antenna 50, the intensity difference between parallel positions within adjacent lanes increases (i.e. a 35 db difference at the point closest to the antenna). In the example shown, the center of each lane is separated from the center of the adjacent lane by a minimum of 14 feet. In this way, the present invention allows transceiver units 18–22 to be spaced apart the typical separation of a conventional toll booth.

As can be seen from the example shown in FIG. 3, a signal strength measurement of −40 db, corresponds to the region of the roadway that is about halfway along defined lane 54. Those skilled in the art will appreciate that the invention can be practiced with other field strength patterns that indicate a position relative to a transmitting unit. Those skilled in the art will further appreciate that the field pattern can be generated by an intermittent or constant transmission or that each field can have independent frequency characteristics.

In one practice of the invention, lane identification information is digitally encoded into the signal broadcast from the transmitting units. For digitally encoded information, data fields are created that establish header information and data information:

| Field | Size |
| --- | --- |
| Start File | 2 bytes |
| Lane Identification | 4 bits |
| End File | 2 bytes |

Those skilled in the art will appreciate that the invention can be practiced in connection with other data field parameters or alternative forms of encoding techniques, such as phase shift keying, manchester encoding or other techniques know in the art.

FIG. 4 depicts detail of the transponder 28. The transponder includes a data processor 70, a signal receiver 72, connected to an antenna element 73, a decoding means 74, connected to the signal receiver 72, a signal strength detection unit 76, connected between receiver 72 and processor 70, an early warning signal detection unit 78 also connected between receiver 72 and processor 70, a transmitter 80, a memory element 88 is connected to processor 70, and a user interface section 83. A conventional power supply 89 provides the power requirements of the transponder.

The processor 70 can be an 8086 microprocessor or an 8051 microcontroller, or other processor capable of executing the calculations necessary to determine vehicle position. In the embodiment depicted in FIG. 4A, decoding means 74, connected to receiver element 72 and processor element 70, decodes the lane identification information encoded in the signal received at receiver 72. In an alternative embodiment, the processor 70 also decodes and interprets the encoded signals in a manner described in greater detail hereinafter. The memory element 88, preferably provides sufficient nonvolatile memory to store program information including information for processing of signal strength detection information and lane identification information.

The transponder antenna 73, can be incorporated into the transponder module itself or a receptacle can be provided to attach to a conventional window mounted antenna, similar to those employed in connection with cellular telephone devices.

The user interface section 83 preferably include user operable keys 82, LCD or LED display unit 84, and a audio alarm module 86. The display and audio alarm elements provide visual, audible alarm signals when necessary, while the keys and display elements enable the vehicle operator to obtain information relating to lane position and distance from stationary base units, as well as enter any information that may be required. The display and user interface keys, in combination with conventional stored software routines controlling the processor, enable the user to view information concerning the vehicles position within a lane or along the roadway. In one embodiment, the user interface includes an alpha numeric display having two lines of ten characters each.

Power supply elements preferably include a compact user replaceable long-life battery 89, such as a lithium power cell. These elements can also include an on/off switch incorporating a battery check position.

Figure 4A:
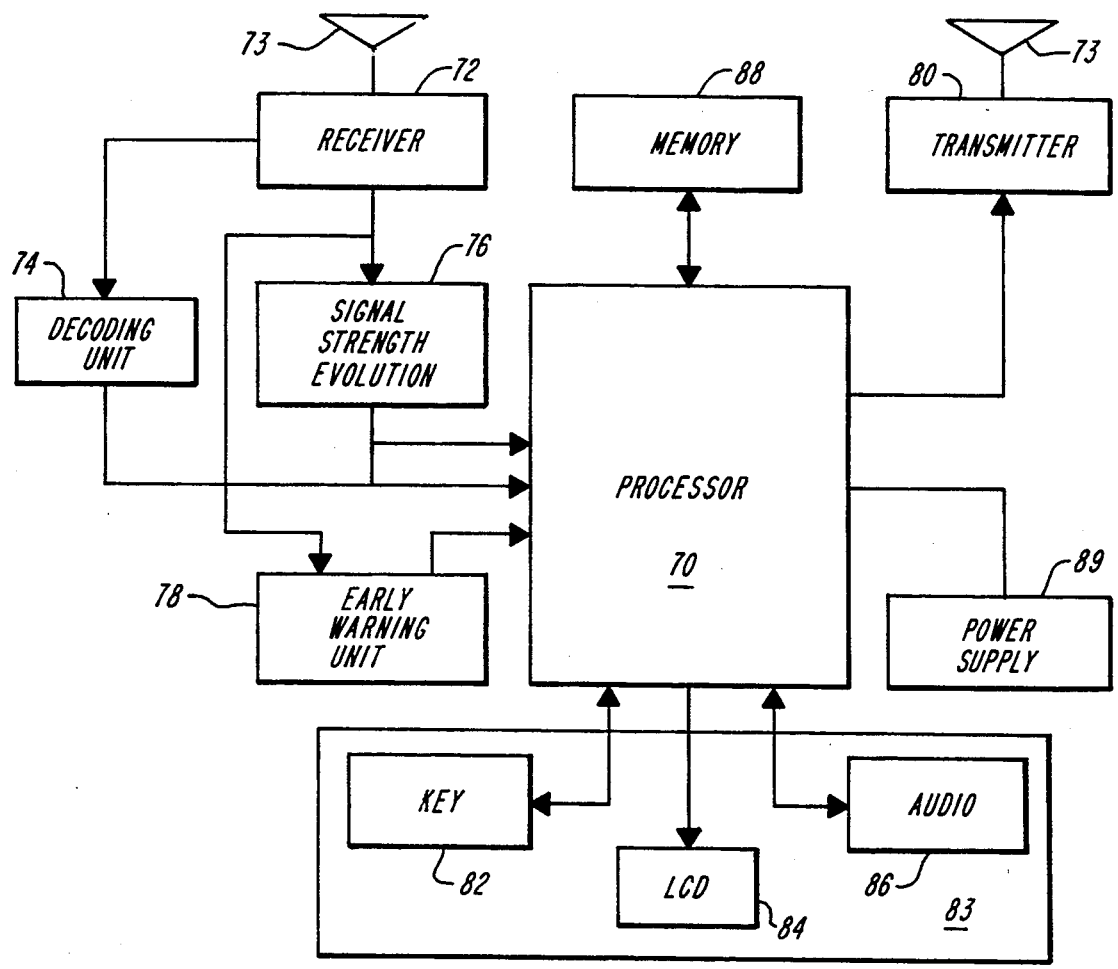
FIG. 4A is a schematic block diagram of a vehicle transponder, particularly adapted for operation in the system of FIG. 1.

The components depicted in FIG. 4A are conventional in design and construction, and the transponder can be constructed in accord with known transponder and microprocessor principles. The illustrated transponder can be housed in a compact portable enclosure adapted for removable attachment to a dashboard surface or other convenient location within a vehicle.

The combination of components depicted in the FIG. 4A enables the transponder to process signal information and determine its lane position and linear distance from a stationary transmitting unit. Furthermore, the transponder memory 88 can store software and algorithms for determining the position of the moving vehicle relative to the positions of the other lanes on the roadway. As will be described in greater detail hereinafter, the relative position of vehicles travelling along a multilane roadway can be transmitted to an automated toll system or other automated traffic management system to determine the sequence of travelling traffic moving along a multilane roadway.

In one embodiment of the invention the microprocessor has a low power consumption state, a standby mode, that is used to conserve power. In standby mode the microprocessor halts all activity. The processor is brought out of this mode by activating an input on the microprocessor 70. Conserving power when the transponder is not processing signal position information, reduces average power demands and significantly extends battery life.

Figure 4B:
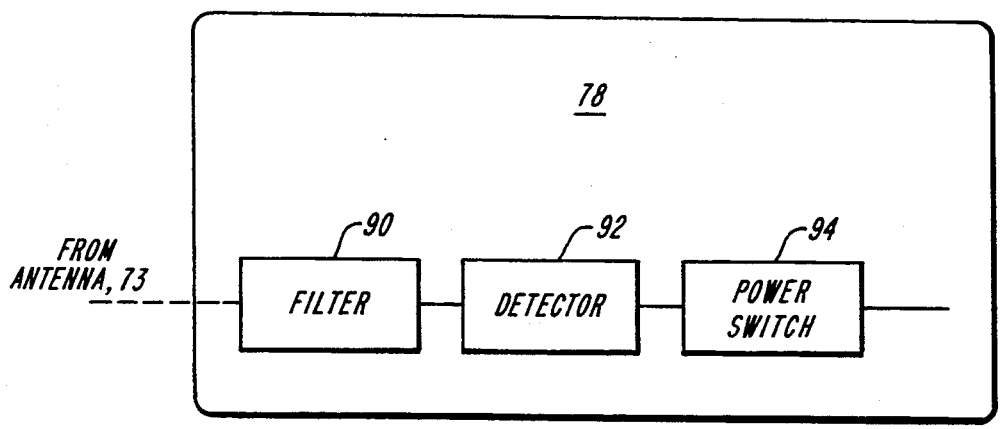
FIG. 4B is a schematic block diagram of an early warning unit of the depicted in FIG. 4A.

FIG. 4B, depicts the components of an early warning unit as practiced in one embodiment of the invention. The function of the early warning unit is to "wake up" the remainder of the transponder circuit via power switch 94. Filter 90 monitors signals picked up by antenna 73. Filter element 90 is a typical bandpass filter constructed as known in the art and functions to detect specific frequencies within the electromagnetic spectrum. Signals passed from filter 90 are sent to detector element 92 that is constructed from a diode and capacitor array or any other construction known in the art. The detector functions to determine the signal strength of the filtered signal. If the filtered signal has sufficient energy then the detector determines the vehicle to be approaching an antenna field pattern. The detector unit 92 relays a signal to power switch 94. Power switch 94 activates the microprocessor 70.

The signal strength detection unit 76 receives the signal from the receiver unit 72. The signal strength detection unit 76 measures the strength of the received analog signal and performs an analog to digital conversion to generate a digital signal indicative of the signal strength. The digital signal is transferred to the processor 70 for determining the position of the vehicle as will be explained in greater detail hereinafter.

The signal decoding means 74 processes signals sent from receiver unit 72 and decodes the lane identification information transmitted with the signal. The lane identification information is sent to the processor means 70. Processor means 70 tags the measured signal strength with the lane identification signal. The processor then uses the lane identification information and the signal strength information to determine position of the vehicle relative to the transmitting units.

In an alternative embodiment, the carrier is removed from the lane identification information signal and the data is left. The lane identity and error correction information is decoded from a manchester encoded format and checked for errors. Other forms of error correction known in the art can be used to check the integrity of the received signal.

Figure 5:
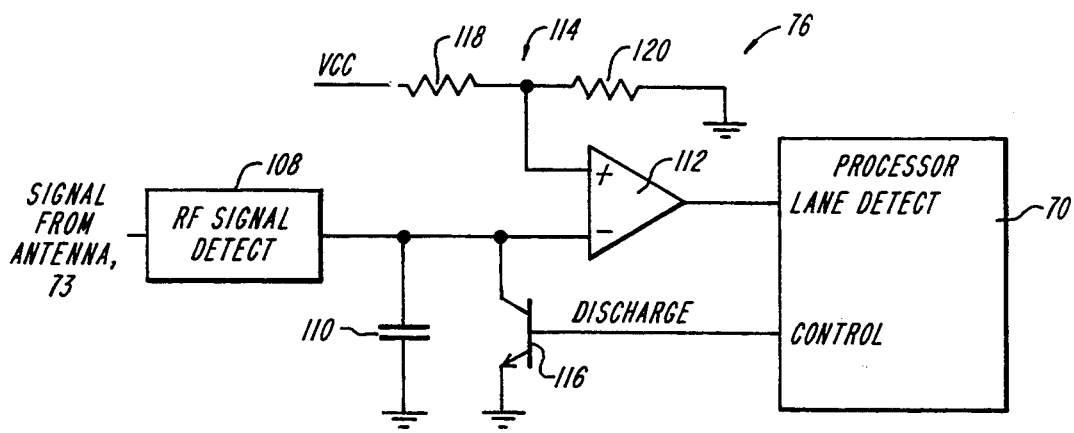
FIG. 5 is a schematic block diagram in accord with one embodiment of the invention for determining the linear distance from a roadway traffic transceiver.

FIG. 5 illustrates one example of the circuit design for the signal strength detection unit 76. The example depicted in FIG. 5 is illustrative of one possible construction of a signal strength detection unit that achieves economy, and therefore promotes the use of the present invention.

A signal received by antenna 73 is sent to unit 76. Signal strength detection unit 76 has a storage capacitor 110 of known value so that capacitor 110 charges at a known rate as the signal from receiver 72 is transferred to the capacitor 110. Unit 76 has a comparator element 112 having its inverting input connected to storage capacitor 110. The non-inverting input of comparator element 112 is connected to a bias element 114. The bias element depicted is a simple voltage divider constructed from two resistors 118 and 120. The voltage across resistor element 120 is a constant reference voltage.

The output of the comparator element 112 is connected to a lane detect input pin on the processor element 70. A high state on the lane detect pin indicates that the voltage across capacitor 110 is greater than the reference voltage across resistor 120. The processor element 70 has an output pin connected to the base input of discharge transistor 116. The collector of discharge transistor 116 is connected to the inverting input of the comparator 112 and the signal input of the storage capacitor 110. The processor can reset the storage capacitor 110 by activating the transistor element 116 through its output control pin.

The configuration of elements in FIG. 5 forms a one bit analog to digital converter that can sample an incoming signal for a specific period of time and compare the collected voltage to a known reference signal. Once the signal is read, the converter is reset, by removing the stored voltage across capacitor 110, and the process runs again. In this way the capacitor 110 and comparator 112 and biasing network 114 form a one bit analog to digital converter that generates a digital signal indicative of the strength of the received signal. The ratio of resistor elements 118 and 120 is chosen to generate a reference voltage on the non-inverting input of the comparator 112 that corresponds to a specific detect signal intensity, for example −40 db. Therefore, by checking the voltage across capacitor 110 at specific times, the processor element 70 samples the strength of the antenna field.

Those skilled in the art will appreciate that the invention can be practiced in connection with other field intensity evaluation methods, specifically methods that use discreet analog to digital converters and methods that generate multi-bit representations of the signal strength of the received signal.

In accord with one embodiment of the invention, the transponder is operated in the following manner to determine lane position and linear distance from the stationary transceivers.

Referring again to FIG. 1, the transponder 28 of vehicle 12 is inactive as it approaches the antenna field 26 of transmitting unit 18. As the vehicle enters field 26, the early warning signal detection unit 78, places the processor 70 in active mode and the transponder begins processing the received signals.

Figure 6:
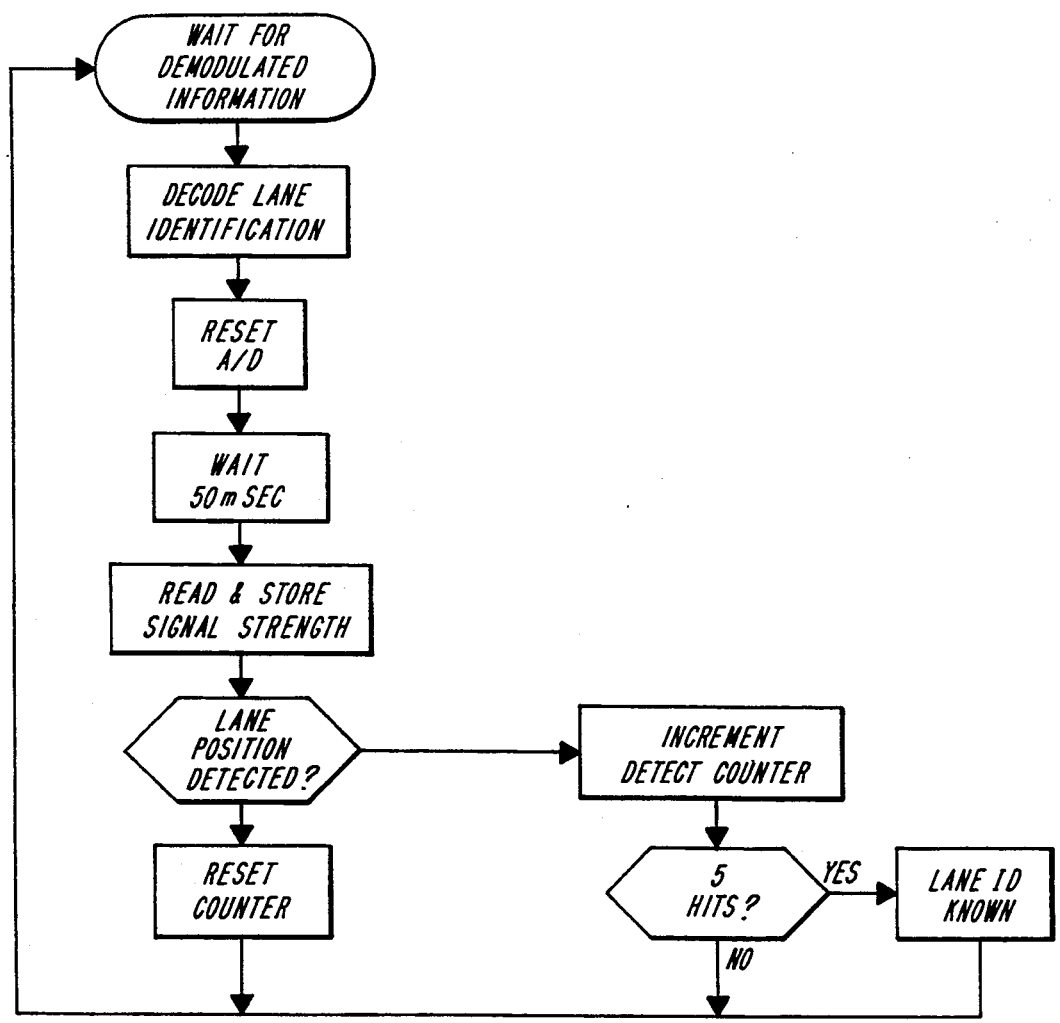
FIG. 6 is a flow diagram of the microprocessor code that determines the validity of a lane detection signal.

FIG. 6 is a flow diagram of the processor code for determining the vehicle lane position. As illustrated in FIG. 6, once the processor 70 is in active mode, the processor waits for the receiver unit 72 to send it the demodulated signal information. The processor 70 decodes the signal identification information and determines the identity of the lane that transmitted the received signal. The processor then resets the signal strength evaluation unit 76, so that this circuit is initialized to zero. The processor then waits a period of time for the signal strength evaluation unit to determine the strength of the signal. In the example given the processor element 70 waits 50 milliseconds, allowing the capacitor 110 to charge. At the end of 50 milliseconds the processor reads and stores the signal strength from this circuit.

Processor 70 then compares the measured signal strength to the known field pattern of the transmitting unit. If the signal strength indicates the vehicle is within the identified lane then the lane position counter associated with that lane identity is incremented. The processor then determines from a preset counter whether enough lane detections have been recorded to indicate a probability of the lane identification. In one example, five consecutive detections of a signal transmitted from the same lane, with a signal strength indicating the vehicle is in that lane, is sufficient to identify the lane position of the vehicle. Once the lane identity has been checked by the signal strength, the processor returns to a wait condition.

In a further embodiment of the invention, the determined lane identification information is stored by the processor 70 in a register of memory 88. The lane identification information along with preassigned vehicle identity information, is then encoded into all signals transmitted from transponder 28 to the stationary transceiver units 18-22. In one example, transmitting units 18-22 are positioned above the lanes of an automated toll plaza. Transceiver units 18-22 control signals to vehicles approaching the tolls that require the vehicles to transmit information signals back to the transceiver unit above that vehicle's lane. In an apparatus constructed in accordance with the present invention, processor 70 retrieves the lane identity from the memory 88 and transmits the lane identity, along with other information, to the transceiver units 18-22. In this way, transceiver units 18-22 overcome the problem of multipathing by correlating each received signal to the correct vehicle.

In another aspect of the invention, a method for determining the position of a vehicle traveling on a multi-lane roadway is determined by the following steps. In the first step a transceiver unit is positioned above one lane of a multi-lane roadway and transmits through a highly directional antenna a signal encoded with lane identification information.

In a second step, a mobile transponder unit receives transmitted signals and processes these signals to determine lane information identification and the strength of the signal information. In a third step the lane identification information and signal strength information is processed to determine the vehicle lane position and distance from the stationary transceiver unit.

A further method comprises storing the lane identification information, so that it can be encoded in al transmissions from the mobile transponder to the transceiver units, in this way allowing the transceiver units to establish the lane position of the transmitting vehicle.

It will thus be seen that the invention efficiently attains the objects set forth above, among those made apparent from the preceding discussion. In particular, the invention provides methods and apparatus for determining the position of a vehicle traveling on a multi-lane roadway.

It will be understood that changes may be made in the above construction and in the foregoing sequences of operation without departing from the scope of the invention. In a further embodiment of the present invention, alternative algorithms are used to determine the position of the vehicle from the relative signal strength associated with each lane identity signal. For example, the relative signal strength of each lane identity signal is determined and compared to known field patterns for multi-lane roadways, and the probable adjacent lanes are determined. In this way, a relative determination of the mobile object's position is made from measurements of the field strength generated by each stationary transceiver unit.

Furthermore, in other constructions of the present invention, the illustrated radio frequency transmitters may be replaced by infrared transmitters or emitters operating in other regions of the electromagnetic spectrum. Moreover, the invention can be practiced in connection with railway or waterway vehicles, or for tracking packages.

It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by the Letters Patent is:

1. Apparatus for determining the location of a mobile object moving in relation to at least one stationary transceiver comprising, a transmitter included in said stationary transceiver for transmitting a substantially constant intensity radio frequency signal, carrying information identifying its location, a highly directional antenna included in each said stationary transceiver for transmitting said radio frequency signal with a predetermined directional variation in field strength forming a known directional field strength pattern for each stationary transceiver, a receiver included in said stationary transceiver for receiving radio frequency signals, and a mobile transceiver having a pre-assigned identity fixed to said object, said transceiver including a transmitter, a receiver, a memory, a data processor, a decoder for determining the location identity of said transmitting stationary,transceiver and a signal strength evaluation circuit, said signal strength evaluation circuit measuring the intensity level of received signals as an analog level, converting the analog level to a digital signal provided to said data processor, said data processor comparing said digital signal to said known directional field strength pattern for said identified stationary transceiver stored in said memory and connected to said data processor, to determine location of said object with respect to said stationary transceiver, and providing to said mobile transceiver transmitter, data to be transmitted back to said stationary transceiver indicating the pro-assigned identity of said object and its location with respect to said stationary transceiver.

2. Apparatus in accordance with claim 1 wherein each said stationary transceiver additionally comprises a data processor, a memory, and a human interface.

3. Apparatus in accordance with claim 1 wherein said object is a vehicle moving along a roadway, and wherein a plurality of said stationary transceivers are spaced apart on, or adjacent to, said roadway and wherein said mobile transceiver includes a human interface means for displaying information relative to said vehicle's location with respect to one or more of said stationary transceivers.

4. Apparatus in accordance with claim 1 wherein said mobile transceiver fixed to said object further comprises a power consumption reduction means for selectively activating said microprocessor in response to signals received from one or more of said stationary transceivers.

5. Apparatus in accordance with claim 1 wherein said signal strength evaluation circuit comprises a charge storage element for storing charge signal representative of the intensity level of the signal received from one or more stationary transceivers, a switch element for discharging said charge storage element and a comparator element for generating a digital signal representative of whether the charge signal is greater than a predetermined reference signal.

6. Apparatus in accordance with claim 1 wherein said processor for processing said digital signal representative of the measured intensity level of received signals comprises decoding means for determining the identity of the transmitting stationary transceiver, initialization means for initializing said signal strength evaluation circuit, timer means for timing the operation of said signal evaluation circuit, logic circuit means for generating a signal representative of location and at least one counter means for counting a series of said signals representative of location.

7. Method for the identification of a mobile object moving in relation to at least one stationary transceiver, the steps comprising, transmitting from a highly directional antenna a radio frequency, substantially constant intensity signal having a predetermined directional variation in field strength forming a known directional field strength pattern for each stationary transceiver, and identifying the location of said stationary transceiver, from a transmitter included in said stationary transceiver, receiving a radio frequency signal from said transmitter in said stationary transceiver at a mobile transceiver fixed to said mobile object, evaluating the signal strength pattern of said radio frequency signal received at said mobile transceiver by measuring the intensity level of received signals as an analog level, decoding said radio frequency signal from said transmitter to identify the location of said transmitter converting said analog level to a digital signal provided to a data processor located at said mobile transceiver, comparing said digital signal provided to said data processor to said known directional field strength pattern associated with said identified transmitter stored in a memory connected to said data processor, to determine location of said object with respect to said stationary transceiver, transmitting data back to said stationary transceiver indicating the identity of said object and its location relative to said stationary transceiver.

8. Method in accordance with claim 7 wherein the distance from said stationary transceiver is determined by measuring the intensity level of received signals, generating a signal representative of object position and incrementing a counter associated with object position until a predetermined count is reached.

9. Apparatus for determining the location of a mobile object moving in relation to at least two stationary, transceiver units, said apparatus comprising, a first transmitter, included in a first of said stationary transceiver units, and including means for transmitting a first substantially constant intensity level radio frequency signal having a first known directionally varying field strength pattern, a second transmitter, included in a second of said stationary transceiver units, and including means for transmitting a second substantially constant intensity level radio frequency signal having a second known directionally varying field strength pattern, wherein each of said first and said second signals also identify the one of said stationary transceiver units in which said transmitter is included, a receiver included in each of said stationary transceiver units, including means for receiving radio frequency signals, a mobile transceiver affixable to said mobile object, and having a preassigned identity, wherein said mobile transceiver includes means for receiving said radio frequency signals from at least said first and said second stationary transceiver units, decoding means for determining from said signals which of said transmitters transmitted each of said signals, means for measuring said intensity level of said radio frequency signals received from said first and said second stationary transceiver units at said mobile transceiver, means for comparing said intensity level of said radio frequency signals received from said first stationary transceiver unit to said first directionally varying field strength pattern and for comparing said radio frequency signals received from said second stationary transceiver unit to said second directionally varying field strength pattern, said first and second directionally varying field strength patterns stored in a memory connected to said comparing means, to determine said location of said mobile object, wherein said location is determined in relation to said first and said second stationary transceiver units, and means for transmitting said mobile receiver preassigned identity and said location back to at least one of said stationary transceiver units.

10. Apparatus in accordance with claim 9 wherein said means for processing additionally comprises means for comparing said intensity level of said signal from said first stationary transceiver with said intensity level of said signal from said second stationary transceiver to determine whether said mobile object is closer to said first stationary unit or said second stationary unit.

11. Apparatus for determining lane location of a vehicle approaching a roadway toll plaza having at least one lane, said apparatus comprising at least one stationary transceiver and at least one mobile transceiver, wherein said stationary transceiver is located proximate to said lane at said toll plaza and comprises, a transmitter for transmitting signals identifying said lane, and a highly directional antenna for directing said transmitted signals with a predetermined directional variation in field strength forming a known directional field strength pattern for each stationary transceiver, along said lane substantially in a direction from which said vehicles are approaching, and wherein said mobile transceiver has a preassigned identity, is affixable to a moving vehicle, and comprises, means for receiving signals, intensity measurement means for measuring field intensity of received signals, decoding means for determining for determining from said transmitted signal the lane proximate to said stationary transceiver, a memory including means for storing information regarding each said known directional field strength pattern, a processor including means for processing said field intensity of said received signals with said information regarding said known directional field strength pattern to determine whether said mobile transceiver is approaching said toll plaza and if so whether said mobile transceiver is located within said lane, and a mobile transceiver transmitter including means for transmitting said mobile transceiver preassigned identity and said lane location back to said stationary transceiver.

12. Apparatus according to claim 11 wherein said toll plaza includes a plurality of said lanes, and said apparatus further comprises a plurality of said stationary transceivers each located proximate to an associated one of said lanes at said toll plaza, each transmitting signals identifying the associated one of said lanes and wherein said mobile transceiver memory further comprises means for storing information regarding a plurality of said known directional field patterns, and said processor further comprises means for processing said field intensity of said received signals, together with the identity lane location of said transmitters with said information regarding said plurality of said known directional field strength patterns to determine whether said mobile transceiver is approaching said toll plaza and if so in which lane said mobile transceiver is located, and said mobile transceiver transmitter further includes means for transmitting said mobile transceiver preassigned identity and said lane location to at least one of said stationary transceivers.

13. Apparatus according to claim 12 wherein said processor includes means for counting incidents of any of said field intensities measured by said intensity measurement means being greater than a preset threshold.

* * * * *

UNITED STATES PATENT AND TRADEMARK OFFICE
CERTIFICATE OF CORRECTION

PATENT NO. : 5,406,275
DATED : April 11, 1995
INVENTOR(S) : John J. Hassett et al.

It is certified that error appears in the above-indentified patent and that said Letters Patent is hereby corrected as shown below:

Col. 10, Claim 1, line 9, should read --said transmitting stationery transceiver, and a signal--.

Claim 9, column 11, lines 29-31, should read --Apparatus for determining the location of a mobile object moving in relation to at least two stationery transceiver units, said apparatus comprising,--.

Claim 9, column 11, line 49, should read --a mobile transceiver, affixable to said mobile object,--.

Claim 12, column 12, lines 45-48, should read --Apparatus according to claim 11 wherein said toll plaza includes a plurality of said lanes, and said apparatus further comprises a plurality of said stationary transceivers, each located proximate to an associated one of--.

Signed and Sealed this

Twenty-sixth Day of November 1996

Attest:

BRUCE LEHMAN

*Attesting Officer*     *Commissioner of Patents and Trademarks*